INVENTOR.
SVEN OLOF ÖSTERMAN his ATTORNEYS

INVENTOR.
SVEN OLOF ÖSTERMAN
BY Brumbaugh, Free,
Graves & Donohue
his ATTORNEYS

United States Patent Office 3,565,634
Patented Feb. 23, 1971

3,565,634
APPARATUS AND METHOD FOR CONTINUOUS EXTRACTION OF FATS FROM ORGANIC MATTER
Sven-Olof Österman, Molndal, Sweden, assignor to Astra Nutrition Aktiebolag, Molndal, Sweden, a company
Filed Aug. 23, 1967, Ser. No. 662,819
Claims priority, application Sweden, Aug. 25, 1966, 11,460/66
Int. Cl. A23j 1/00
U.S. Cl. 99—18
16 Claims

ABSTRACT OF THE DISCLOSURE

An apparatus and method for continuously extracting fats from organic matter such as fish, with fat solvents to prepare a defatted protein having no objectionable odor or taste, comprising a vertical pre-extracting vessel in which the organic material and fat solvent are combined and having means for stirring and withdrawing the fat-rich solvent. The pre-extraction vessel is connected to an inclined counter-flow extraction tube having means for transporting the defatted organic matter through solvent introduced into the tube. The counter-flow extractor is connected to a series of centrifuges and counter-flow evaporators to remove the solvent from the defatted organic matter.

---

This invention refers to an apparatus and a method for producing defatted protein products, and more particularly to means for continuous extraction of fats and oils from organic materials, such as fish and aquatic animals, by means of one or several organic solvents.

As is well known in removing fats from organic matter, it is of the utmost importance that almost complete removal of fats be achieved, because the phospholipides contained in the fats give a characteristic offending odor and taste if present in the final product. The removal of the solvent is also an important condition to obtaining an acceptable final product, since an unsuitable treatment during the solvent removal reduces the yield of proteins and may leave a residue of solvent. Even traces of solvent, though not toxic per se, often give the product an unpleasant taste.

Several different types of apparatus for continuous extraction of fats from organic materials have been proposed. In such a known apparatus the material is fed into the upper end of a slightly inclined, tube-shaped extractor and is then conveyed through the extractor downwards into a second extractor, which is arranged acute-angled to the first extractor. The material is fed upwards in the second extractor while the solvent is pumped into the second extractor and is forced back through the two extractors. The material is then fed into a horizontal drier where the water and the solvent are evaporated prior to complete removal of the solvent in a horizontal counter-flow evaporator having an open feeding screw.

In a second known, continuously operating apparatus for counter-flow extraction of oil from fish and fish waste, the fish or the fish waste is first boiled in two horizontally arranged tube boilers of screw type for evaporation of the water contents in the extraction material, and is thereupon saturated with a solvent before the material is fed into the lower portion of a slightly inclined counter-flow extractor of screw-type in which the extraction takes place. The extraction may be of the washing type or the soaking type, depending on the solvent level in the extractor. The material is then fed into a series of driers in which the material is exposed to heat for the removal of solvents and for drying.

The disadvantages in these two arrangements are several. The two are intended for heavy halogenated hydrocarbons, such as trichloroethylene and perchloroethylene. It has turned out that such solvents do not adequately dissolve phospholipides and are toxic. Further, the angle of inclination of the extractors is in both cases small, which results in a long gradient and consequently in a reduced extraction of the material. The two apparatuses also contain a type of evaporation and drying device that involves a long path for the material to be transported along hot surfaces and creates thereby a risk of protein destruction. In addition, none of the apparatuses is provided with a device for primary evaporation of the solvent. The apparatus first described has no device for forcing the solvent toward the center of the feeding screw, which causes the solvent to flow along the surface of the extractor. The most important drawback in the second apparatus is to be seen therein that the feeding screw is carried eccentrically and arranged in such a way that an interstice is formed between the feeding screw and the upwards turned surface of the extractor which results in the solvent finding its way into the interstice and thus reducing the extraction power. Further, the evaporation in the tube boilers involves the risk of protein destruction.

In a third known apparatus the extraction is carried out in the counter-flow, wherein the material is shaken down through a vertical rectangular extractor and is then fed upwards by means of a chain pump through an inclined rectangular drum.

In the third apparatus described, the drawback exists in that the solvent does not pass through the material in the inclined drum, but finds its way along the upper side of the drum. In the vertically arranged extractor the solvent also finds its way along the sides of the extractor, because there is no device for forcing the solvent through the material. Further, the extraction does not take place without other problems because materials and solvents are used having a small difference in density, and the organic material is forced to move downwards during the shaking, and the solvent at the same time is pressed upwards.

It is therefore an object of the present invention to provide a continuously operating apparatus, which achieves an almost complete defatting of fat-containing organic material and a complete removal of the solvent used at the extraction, such that there is obtained a final product which is suitable for nutritional purposes and for feeding without objectionable fats and oils, tastes and odors.

It is possible to overcome the drawbacks of the apparatuses described above, and achieve the objects of the invention by the following apparatus and method. The material is exposed to a first extraction in at least one vertically arranged pre-extractor provided with a stirring device, said pre-extractor being connected to a counterflow extractor provided with a feeding screw, having apertures in the blades and driving rods if desired. The counter-flow extractor is connected to separating and evaporating devices to remove the solvent. Such devices include one or more centrifuges and one or more counter-flow evaporators or the like.

According to a preferred embodiment of the invention several, preferably two, pre-extractors connected in series are used at the first extraction.

The method proposed according to the invention may be carried out continuously and comprises adding organic material and fat solvent to at least one vertically arranged pre-extractor provided with a stirring device. The material is extracted a first time and transferred to an inclined counter-flow extractor by means of a centrifuge if desired. Essentially pure solvent is added continuously to the counterflow extractor in counter-flow, and is forced into the pre-extraction vessels from the counter-flow extractor. The fat-rich solvent is continuously drawn off the organic material and is replaced by fresh solvent. The material flows from the counter-flow extractor into one or more centrifuges and counter-flow evaporators which effectively remove the remaining solvent from the organic product.

The invention is described in detail as follows, with reference to several preferred embodiments of extraction apparatuses shown in the accompanying drawings. In the drawings.

Figure 1:
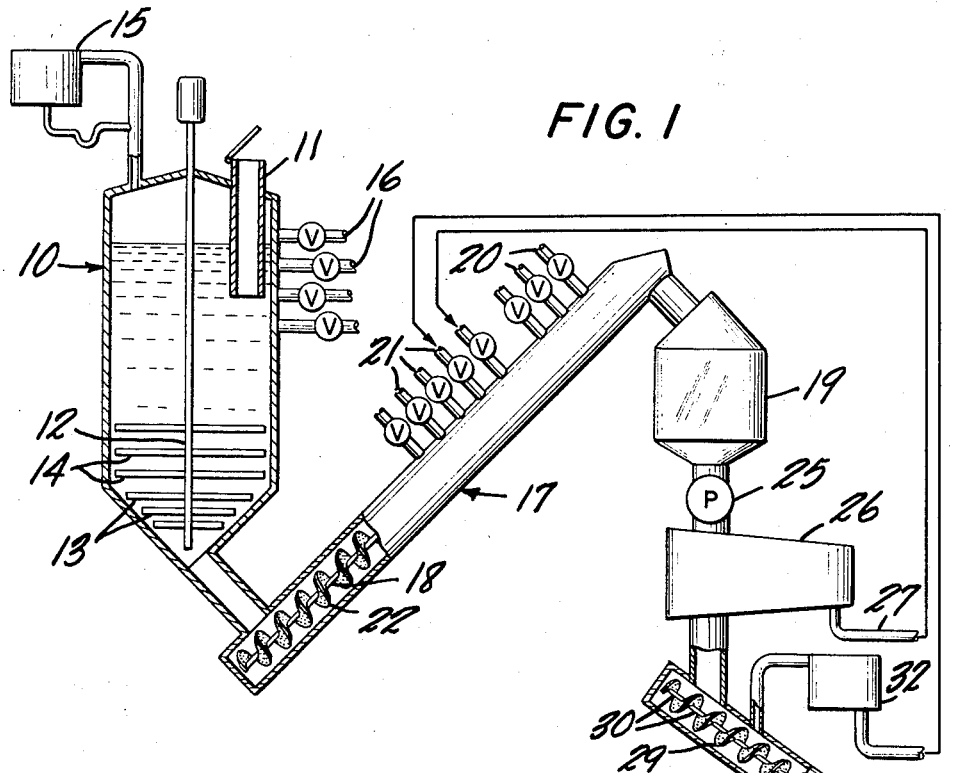
FIG. 1 shows a first extraction device.

In FIG. 1, a cylindric pre-extractor 10 with a lower conical portion is arranged vertically. The upper portion of the pre-extractor 10 is provided with a feeding circuit 11 being vertically displaceable through which the fat-containing material may be fed into the pre-extractor 10. A stirring device 12, provided with radially directed vanes or blades 13, 14, is arranged in the lower portion of the pre-extractor 10. The vanes 13 situated in the conically shaped portion are horizontal blades with the flat surfaces inclined from the vertical, and the vanes situated in the cylindrical portion having the flat portion of the blades 14 arranged vertically.

The upper portion of the pre-extractor 10 is connected to a condenser 15 from which condensed solvent is recycled to the pre-extractor 10. The pre-extractor 10 is provided with outlet conduits 16 at different levels for drawing off organic solvent which is rich in fat.

The bottom of the pre-extractor 10 is connected to the lower portion of an inclined tube-shaped counter-flow extractor 17 provided with a mantle. The counter-flow extractor 17 is provided with a feeding screw 18, which feeds the material to a transparent inspection magazine 19. The inclined counter-flow extractor 17, which is disposed at an angle of 45°, preferably has conduits 20, 21 arranged in groups at different levels for introduction of the solvent.

Figure 2:
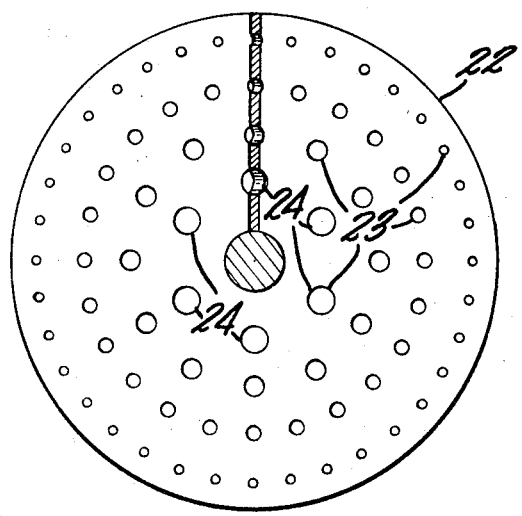
FIG. 2 shows a blade turn of the feeding screw in the counter-flow extractor according to FIG. 1, which is provided with passage apertures.

In FIG. 2, the blade portion 22 of the feeding screw 18 arranged in the counter-flow extractor 17 is provided with a number of apertures 23, which at the lower portion of the feeding screw 18 are arranged in four concentric circles. The number of the apertures 23 in each circle increases and the diameter of the apertures in each circle decreases in the direction away from the center shaft of the feeding screw 18, e.g. in such a way that the numbers of apertures 23 per circle amount to 6, 12, 24 and 36, respectively, and the diameter of the apertures 23 in the different circles are 8, 6, 4 and 3 mm., respectively. The upper portion of the feeding screw 18 is provided with apertures 24 arranged only in one inner circle with six such apertures each having a diameter of 8 mm.

In FIG. 1, the inspection magazine 19 is provided with a slurry pump 25, connected to an endless screw centrifuge 26. The endless screw centrifuge 26 is provided with a conduit 27 which is connected to the lower group of conduits 21 for introducing solvent into the counterflow extractor 17.

The centrifuge 26 is connected to the upper portion of an inclined counter-flow evaporator 28 provided with a feeding screw 29 and is preferably at an angle of 30° to the horizontal plane. The feeding screw 29 is preferably provided with a number of axial interspaces 30 for forming screw blades 31 displaced from turn to turn. The upper portion of the counter-flow evaporator 28 is connected to a condenser 32 for collecting the steam mixture of solvent and water formed in the counter-flow evaporator 28. The material relieved of fat and solvent in the counter-flow evaporator 28 is fed to a container 33 through a conduit 34 connected to the lower end of the counter-flow evaporator 28. The conduit 34 is connected with a steam conduit 35.

The method for extracting fats from organic materials utilizes the apparatus of the invention in the following manner. When the pre-extractor 10 and the counter-flow extractor 17, which are connected to each other, have been filled with pure solvent to the level of any of the outlet conduits 16, the counter-flow extractor 17 is continuously fed with solvent through the conduits 20, 21 simultaneously as the fat-containing organic material is introduced into the pre-extractor 10 through the feeding conduit 11 which is adjusted in vertical direction in such a way that its lower portion opens under the solvent surface so as to facilitate the sedimentation in the pre-extractor 10. The organic material suspended in the solvent slowly sinks in the pre-extractor 10 which is heated to an operation temperature of 70–80° C. The vanes 13, 14 rotating slowly, prevent the formation of channels in the sludge by the solvent rising through the conduit from the lower portion of the counter-flow extractor 17. The solvent being fed to the counter-flow extractor 17 is pure solvent through the upper group of conduits 20, and solvent poor in fat through the lower group of conduits 21.

The inclined-blade vanes 13, arranged in the conical portion of the pre-extractor 10, press the sludge downwardly into the lower portion of the counter-flow extractor 17. The sludge is transferred by the feeding screw 18 through the counter-flow extractor 17 heated to an operation temperature of 70–80° C. This feeding may, of course, be carried out in any other suitable manner.

In the pre-extractor 10 a successsive extraction in counter-flow of the continuously fed fat-containing organic material takes place with the solvent rising from the counter-flow extractor 17 and flowing upwards into the pre-extractor 10. The solvent rich in fat obtained at the extraction is drawn off through any of the outlet conduits 16. As the extracted organic material with its content of fat-containing solvent is fed through the counter-flow extractor 17, the fat-containing solvent preferably is replaced first with solvent poor in fat from the lower conduits 21, and then at the upper portion of the counter-flow extractor 17 with almost pure solvent from the upper conduits 20.

The pure solvent and the solvent poor in fat which are fed into the counter-flow extractor 17 through the conduits 20, 21 flow down the counter-flow extractor 17 due to the inclination of the counter-flow extractor 17 and the pre-adjusted difference between the liquid levels in the pre-extractor 10 and the counter-flow extractor 17. The solvent flows through the organic material being forced upwards through the counter-flow extractor 17 by the feeding screw 18.

By means of the apertures 23 arranged in the feeding screw 18 a flow of solvent is directed radially towards the center of the screw 18 which gives an efficient washing of the organic material.

The material relieved of fat is then fed through the inspection magazine 24 to the endless screw centrifuge 26 in which the main portion of the solvent is removed from the material. The remaining solvent is driven off by means of steam in the subsequent counter-flow evaporator 28. The mixture of solvent and steam is removed to the condenser 32. By means of the interspaces 30 arranged in the feeding screw 29 the organic matter is thoroughly mixed during the rotation of the feeding screw to produce the greatest possible contact between the steam and the organic material.

The material relieved of solvent is fed continuously from the counter-flow evaporator 28 to the container 33, whereupon the material is conveyed to a device, not shown, for drying in a way known in the art.

The solvent rich in fat drawn off from the pre-extractor is distilled in a distillation apparatus not shown, from which distilled solvent is fed to the counter-flow extractor 17 through the upper group of conduits 20. The solvent separated in the endless screw centrifuge 26 and the condenser 32 is recycled without any previous purification to the counter-flow extractor 17 through the lower group of conduits 21.

If the raw organic material comprises fish meal, it is preferable to add one part water to two parts fish meal to provide optimum extraction conditions.

Figure 3:
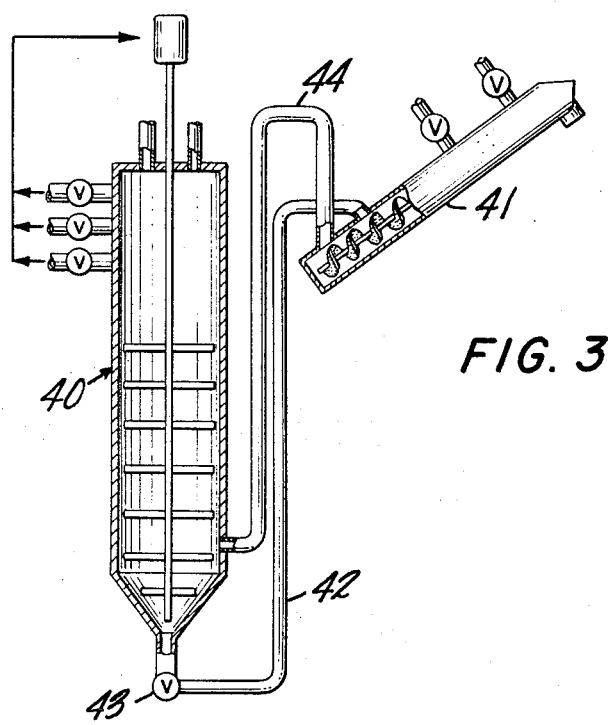
FIG. 3 shows a modified embodiment of the apparatus according to FIG. 1.

In the apparatus shown in FIG. 3, the connection between the lower portion of the pre-extractor 40 and the lower portion of the counter-flow extractor 41 is achieved by means of a feeding conduit 42 provided with a pump 43. The solvent is transferred from the counter-flow extractor 41 to the pre-extractor 40 through a conduit 44. Otherwise the apparatus in FIG. 3 corresponds to the apparatus in FIG. 1 or FIG. 4, as follows.

Figure 4:
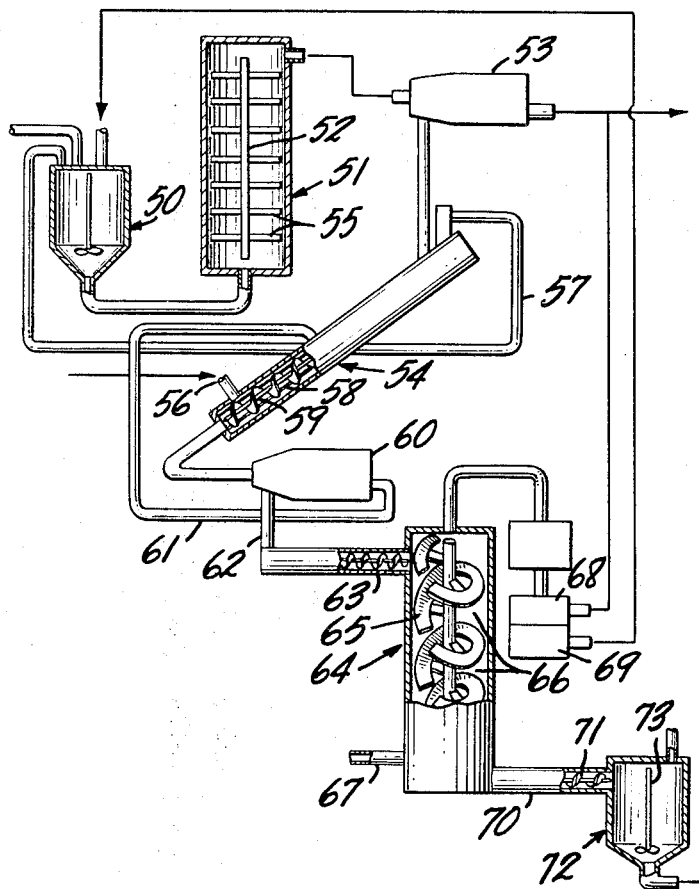
FIG. 4 shows a second embodiment of the apparatus.
Figure 4:
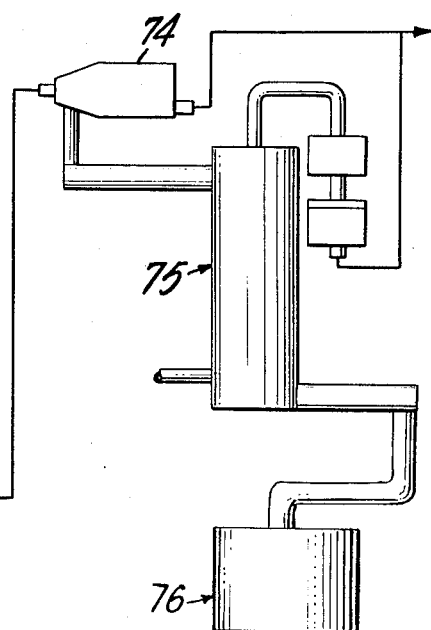

In the apparatus shown in FIG. 4, a second pre-extractor 51 provided with a stirring device 52 has been connected in series after the first pre-extractor 50. A centrifuge 53 has been attached between the pre-extractor 51 and the counter-flow extractor 54. In this illustration, the solvent, water and raw material are mixed in the pre-extractor 50, and the main extraction then takes place in the second pre-extractor 51. So as to maintain the solvent in contact with the material for longer periods of time, the stirring device 52 in the pre-extractor 51 is provided with vanes 55, over the whole of its length, situated at a distance from each other and extending essentially perpendicularly to the shaft of the stirring device 52. The vanes 55 produce in their respective horizontal plane the necessary contact between the solvent and the material.

As a modification to the counter-flow extractor shown in FIGS. 1 and 3 the counter-flow extractor 54 shown in FIG. 4 operates in the opposite way, in that the pre-extracted and centrifuged mass is fed into the upper portion of the counter-flow extractor 54 and the solvent is introduced in the *lower* portion of the counter-flow extractor 54 through a conduit 56. The solvent is drawn off from the upper portion of the counter-flow extractor 54 through a conduit 57 to the pre-extractor 50. In order to avoid the mass sliding down along the inclined inner wall of the counter-flow extractor 54, the feeding screw 58 has been provided with drivers 59, which are arranged between the blades of the feeding screw 58 at a distance from and essentially parallel to the shaft of the feeding screw 58. Due to the arrangement of the drivers 59, the mass is thoroughly stirred to maintain the desirable contact with the solvent.

From the counter-flow extractor 54, the mass, now containing essentially pure solvent, is fed to a centrifuge 60. The solvent obtained from the centrifugal treatment is fed to the counter-flow extractor 54 by the conduit 61. The mass is transferred by a conduit 62, provided with a feeding screw 63, to the upper portion of the counter-flow evaporator 64, which in the illustrated embodiment comprises a vertical container provided with a stirring device 65 in the shape of an open helix provided with interspaces 66. The steam is fed through a conduit 67 to the bottom of the evaporator 64. The resulting solvent phase 68 is fed to a distillation apparatus, and the water phase 69 can be used with advantage for wetting the organic material in the pre-extractor 50, if necessary.

In certain cases wherein high demands are placed on the purity of the final product, a further extraction or washing process may be carried out. As shown in FIG. 4, the product relieved of solvent obtained from the bottom of the counter-flow evaporator 64 may be transferred through a conduit 70 provided with a feeding screw 71 to a mixing vessel 72 provided with a stirring device 73. New solvent is added and mixed with the product. After centrifugal treatment 74 the solvent again is removed in a counter-flow evaporator 75 and the pure product thus obtained may be finally dried in a known manner in a dryer 76.

The invention may be used to produce proteins from fish, such as pressed fish or fish meal, as well as from other organic matter. Those skilled in the art will be aware of other embodiments of the invention, which are also intended to be included within the scope of the claims.

I claim:

1. An apparatus for continuously extracting fats and oils from organic material, comprising at least one vertically disposed pre-extractor vessel having means for stirring and means for removing fat-rich solvent, said pre-extractor vessel being connected by at least one conduit at its lowermost end with one end of an inclined counter-flow extractor vessel, said conduit permitting the passage of solvent from said counter-flow extractor to said pre-extractor and permitting the flow of organic material from said pre-extractor to said counter-flow extractor, said counter-flow extractor having means for continuoulsy introducing fat solvents into said counter-flow extractor and having means for transporting said organic material through said counter-flow extractor in the opposite direction from the flow of said solvent, said counter-flow extractor being connected at its end opposite said pre-extractor with a centrifuge, said centrifuge being connected with at least one counter-flow evaporator having means for introducing a solvent-dissolving medium into said counter-flow evaporator to dissolve solvent residue and having means for transporting said organic material through said counter-flow evaporator, said counter-flow evaporator also having means of removing said solvent-dissolving medium and dissolved solvent mixture from said evaporator.

2. An apparatus as described in claim 1, wherein said counter-flow evaporator is connected with means for drying the extracted organic product.

3. An apparatus as described in claim 1, wherein two pre-extraction vessels are connected to each other in series, one of said vessels being connected with a centrifuge, said centrifuge being also connected with said counter-flow extractor.

4. An apparatus as described in claim 1, wherein said means for transporting organic material in said counter-flow extractor comprises a rotatable shaft having a helical blade extending the length of said shaft, said blade having a plurality of apertures therein permitting the passage of organic matter and solvent through said apertures.

5. An apparatus as described in claim 1, wherein said counter-flow evaporator is connected to said counter-flow extractor by a conduit, permitting the solvent-dissolving medium and solvent mixture to return to said counter-flow extractor for reuse therein.

6. An apparatus as described in claim 1, including means for introducing separately into said counter-flow extractor both fat-containing solvent and pure solvent.

7. An apparatus as described in claim 1, wherein said inclined counter-flow extractor has means for introducing said organic material from said pre-extractor into the lower end of said counter-flow extractor has means for transporting said organic material toward the upper end, and has means for introducing separately pure and fat-containing solvents into the upper end of said counter-flow extractor.

8. An apparatus as described in claim 1, wherein said inclined counter-flow extractor has means for introducing said organic material from said pre-extractor into the upper end of said counter-flow extractor, means for transporting said organic material toward the bottom of said counter-flow extractor, and means for introducing pure and fat-containing solvents into the lower end of said counter-flow extractor.

9. An apparatus as described in claim 1, wherein said counter-flow extractor is disposed at an angle of from 30° to 70° from the horizontal.

10. An apparatus as described in claim 1, wherein said counter-flow evaporator is connected to a second centrifuge, and said second centrifuge is connected to a second counter-flow evaporator.

11. A method for continuously extracting fats and oils from organic material comprising the steps of continuously introducing organic material into at least one vertically disposed pre-extractor, continuously introducing fat-dissolving solvent into the bottom of said pre-extractor to extract the fats and oils from the organic materials, mixing the organic material and the solvent, continuously removing a portion of the fat-rich solvent from a point near the top of said vessel, transporting the mixture of organic material and fat-rich solvent to an inclined counter-flow extractor, continuously replacing the fat-rich solvent with substantially pure solvent and solvent poor in fat in the counter-flow extractor and transporting said solvent from said counter-flow extractor to said pre-extractor, transporting the extracted organic material from said counter-flow extractor to at least one centrifuge, centrifuging the extracted organic material to remove a portion of the solvent contained therein, transporting the extracted organic material to at least one counter-flow evaporator, introducing steam to extract the remaining solvent from the extracted organic material, resulting in substantially fat-free and solvent-free organic material.

12. A method as set forth in claim 11, wherein the organic material is fed through at least two pre-extractors to extract fats and oils from the organic material, and then centrifuged to remove a portion of the fat-rich solvent, prior to being transferred to the counter-flow extractor.

13. A method as set forth in claim 11, wherein following the first counter-flow evaporation step, the extracted organic product is centrifuged and transported to a second counter-flow evaporator for further extraction of traces of solvent.

14. A method for continuously extracting fats and oils from organic material as set forth in claim 11, wherein impure solvent is introduced continuously into the counter-flow extractor, said impure solvent containing steam and dissolved fats, and being introduced into said counter-flow extractor at a point where said impure solvent washes the fat-rich solvent from the organic material before said organic material is washed by the essentially pure solvent.

15. A method as set forth in claim 11, wherein the organic material is centrifuged following the pre-extraction step and prior to being transported to the counter-flow extractor.

16. A method as set forth in claim 11, wherein said fat-poor solvent is introduced into the counter-flow extractor at a plurality of locations and the substantially pure solvent is introduced into the counter-flow extractor at another plurality of locations, the locations at which substantially pure solvent is introduced being farther from the pre-extractor than the locations at which impure solvent is introduced.

References Cited

UNITED STATES PATENTS

| 2,074,988 | 3/1937 | O'Brien | 87—6 |
| 2,559,257 | 7/1951 | Obey | 260—123.5 |
| 3,076,708 | 2/1963 | Cavanagh | 99—7 |

RAYOND N. JONES, Primary Examiner

R. B. ANDEWELT, Assistant Examiner

U.S. Cl. X.R.

23—270, 310, 312; 260—412